United States Patent
Inoue et al.

(10) Patent No.: US 11,080,832 B2
(45) Date of Patent: Aug. 3, 2021

(54) IMAGE PROCESSING METHOD, IMAGE PROCESSING APPARATUS, IMAGING APPARATUS, AND STORAGE MEDIUM

(71) Applicant: CANON KABUSHIKI KAISHA, Tokyo (JP)

(72) Inventors: Chiaki Inoue, Utsunomiya (JP); Yoshinori Kimura, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/576,937

(22) Filed: Sep. 20, 2019

(65) Prior Publication Data

US 2020/0098100 A1    Mar. 26, 2020

(30) Foreign Application Priority Data

Sep. 26, 2018 (JP) .............................. JP2018-180646
Aug. 22, 2019 (JP) .............................. JP2019-152000

(51) Int. Cl.
*G06T 5/50* (2006.01)
*G06T 5/00* (2006.01)
(Continued)

(52) U.S. Cl.
CPC ................ *G06T 5/50* (2013.01); *G06T 5/002* (2013.01); *H04N 5/23232* (2013.01); *H04N 5/23238* (2013.01); *H04N 5/247* (2013.01); *G06T 2207/20081* (2013.01); *G06T 2207/20084* (2013.01); *G06T 2207/20212* (2013.01)

(58) Field of Classification Search
CPC . G06T 5/50; G06T 5/002; G06T 2207/20081; G06T 2207/20084; G06T 2207/20212; H04N 5/23232; H04N 5/23238; H04N 5/247
See application file for complete search history.

(56) References Cited

U.S. PATENT DOCUMENTS

2018/0061020 A1* 3/2018 Hiasa ........................ G06T 3/60
2018/0070023 A1* 3/2018 Oh ........................ H04N 5/2625
(Continued)

FOREIGN PATENT DOCUMENTS

CN    103888689 A    6/2014
CN    106570850 A    4/2017
(Continued)

OTHER PUBLICATIONS

Extended European Search Report issued in European Appln. No. 19199118.1 dated Dec. 2, 2019.
(Continued)

*Primary Examiner* — John R Schnurr
(74) *Attorney, Agent, or Firm* — Rossi, Kimms & McDowell LLP

(57) ABSTRACT

An image processing method includes the steps of acquiring a first image, acquiring a second image that has a noise amount larger than that of the first image and has high frequency components of an object more than those of the first image, and inputting the first image and the second image into a neural network, and generating a third image having the high frequency components of the object more than those of the first image and having the noise amount smaller than that of the second image.

20 Claims, 8 Drawing Sheets

(51) Int. Cl.
    *H04N 5/232*     (2006.01)
    *H04N 5/247*     (2006.01)

(56) References Cited

U.S. PATENT DOCUMENTS

2019/0166294 A1\*   5/2019   Ouyang ................... G06T 5/50
2020/0057450 A1\*   2/2020   Calleija ............. G06K 9/00805

FOREIGN PATENT DOCUMENTS

| CN | 107767408 A | 3/2018 |
| CN | 108391035 A | 8/2018 |
| EP | 3296951 A1 | 3/2018 |

OTHER PUBLICATIONS

Ignatov "DSLR-Quality Photos on Mobile Devices with Deep Convolutional Networks." arXiv 1704.02470v2.2017: 1-16. Cited in the specification.

Office Action issued in Chinese Appln. No. 201910898810.6 dated Mar. 31, 2021. English translation provided.

\* cited by examiner

FIG. 6A
FIG. 6B
FIG. 6C
FIG. 6D
|  | FIRST INPUT IMAGE (MAIN IMAGE) | SECOND INPUT IMAGE (SUB IMAGE) | OUTPUT IMAGE OBTAINED FROM IMAGE PROCESSING ACCORDING TO THIS EMBODIMENT |
|---|---|---|---|
| SSIM | 0.5591 | 0.8055 | 0.8453 |
FIG. 7

IMAGE PROCESSING METHOD, IMAGE PROCESSING APPARATUS, IMAGING APPARATUS, AND STORAGE MEDIUM

BACKGROUND OF THE INVENTION

Field of the Invention

The present invention relates to an image processing method that processes a plurality of input images using a convolution neural network for the plurality of input images.

Description of the Related Art

Recently, in order to improve the image quality, an image processing technology using a convolutional neural network (CNN) has begun to be used. The CNN is a learning type image processing technology that convolves a filter generated by learning with an input image, adds a bias generated by the learning, then repeats a nonlinear operation, and convert it into a desired output image. This learning is performed with a learning image including a set of an input learning image and an output learning image. Briefly, learning is to prepare a large amount (such as several tens of thousands) of input learning images corresponding to input images and output learning images corresponding to output images, and to learn a relationship between input and output images based on these learning images.

For example, Andrey Ignatov, Nikolay Kobyshev, Radu Timofte, Kenneth Vanhoey, Luc Van Gool, "DSLR-Quality Photos on Mobile Devices with Deep Convolutional Networks", arXiv: 1704.02470v2, United States, 2017 (Ignatov et al.), discloses a CNN that acquires an input learning image through a smartphone camera and an output learning image through a digital single-lens camera, and converts a smartphone camera image as an input image into a digital single-lens camera image quality. Thereby, the small smartphone camera can obtain an image close to the image quality of a digital single-lens camera that is a large-sized imaging apparatus.

However, the method using the CNN disclosed in Ignatov et al. has insufficient effects in restoring a high frequency component and reducing noises, because the method uses only an image acquired by one imaging capturer for the input image. In general, the noise amount in the captured image depends on the pixel size of the image sensor. Thus, as the pixel size becomes larger, an image with a smaller noise amount is available. On the other hand, as the pixel size becomes smaller, the reproducibility of the high frequency component of the object can be improved. In other words, there is a trade-off relationship between the reproducibility of the high frequency component and the reduction of the noise amount, and it is thus difficult to improve both of them only with the image acquired by one image capturer.

SUMMARY OF THE INVENTION

The present invention provides an image processing method, an image processing apparatus, an imaging apparatus, and a program or a storage medium, each of which can reduce a noise amount while restoring a high frequency component of a captured image.

An image processing method according to one aspect of the present invention includes the steps of acquiring a first image, acquiring a second image that has a noise amount larger than that of the first image and has high frequency components of an object more than those of the first image, and inputting the first image and the second image into a neural network, and generating a third image having the high frequency components of the object more than those of the first image and having the noise amount smaller than that of the second image. A non-transitory computer-readable storage medium storing a program for causing a computer to execute the above image processing method also constitutes another aspect of the present invention.

An image processing apparatus according to another aspect of the present invention includes an acquirer configured to acquire a first image, and a second image that has a noise amount larger than that of the first image and has high frequency components of an object more than those of the first image, and a calculator configured to input the first image and the second image into a neural network, and to generate a third image having the high frequency components of the object more than those of the first image and having the noise amount smaller than that of the second image. An imaging apparatus includes a first image capturer configured to capture a first input image, a second image capturer configured to capture a second input image, and the above image processing apparatus also constitutes another aspect of the present invention.

An image processing system according to another aspect of the present invention includes a first apparatus and a second apparatus. The first apparatus includes a transmitter configured to transmit a request for causing the second apparatus to execute image processing using a first image and a second image having a noise amount larger than that of the first image and high frequency components of an object more than those of the first image. The second apparatus includes a receiver configured to receive the request sent from the transmitter, an acquirer configured to acquire the first image and the second image, and a calculator configured to input the first image and the second image into a neural network and to generate a third image having the high frequency components of the object more than those of the first image and the noise amount smaller than that of the second image.

A method of manufacturing a learned model according to another aspect of the present invention includes the steps of acquiring a first image, acquiring a second image having a noise amount larger than that of the first image and high frequency components of an object more than those of the first image, acquiring a third image having the high frequency components of the object more than those of the first image and the noise amount smaller than that of the second image, and updating a parameter for the neural network by learning using the first image, the second image, and the third image.

Further features of the present invention will become apparent from the following description of exemplary embodiments with reference to the attached drawings.

BRIEF DESCRIPTION OF THE DRAWINGS

FIGS. 6A to 6D illustrate image processing results according to the first embodiment.

FIG. 7 is a numerical calculation result of image processing according to the first embodiment.

DESCRIPTION OF THE EMBODIMENTS

Figure 1A:
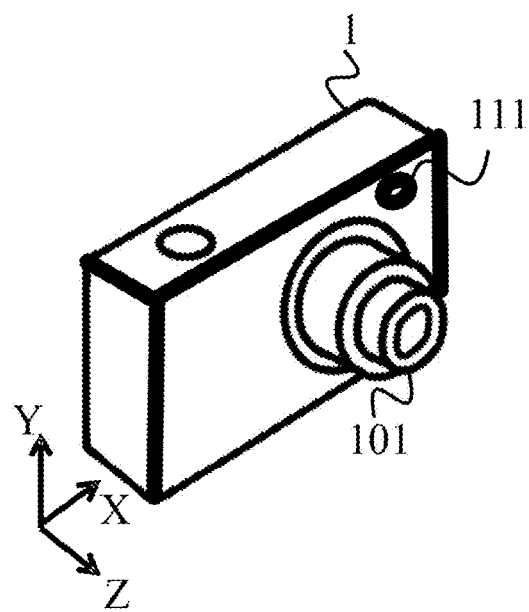
FIGS. 1A and 1B are overviews of an imaging apparatus according to a first embodiment.

Referring now to the accompanying drawings, a description will be given of embodiments according to the present invention. Corresponding elements in respective figures will be designated by the same reference numerals, and a description thereof will be omitted.

Prior to a specific description of embodiments, a gist of the present invention will be described. The present invention reduces a noise amount while restoring a high frequency component in a captured images acquired by a plurality of different image capturers using a convolutional neural network (CNN) as one deep learning type. Each of the embodiments described below generates a high quality image (third image) having a high resolution and a small noise amount particularly based on an image (first image) having a low resolution and a small noise amount and an image (second image) having a high resolution and a large noise amount.

First Embodiment

Figure 1B:
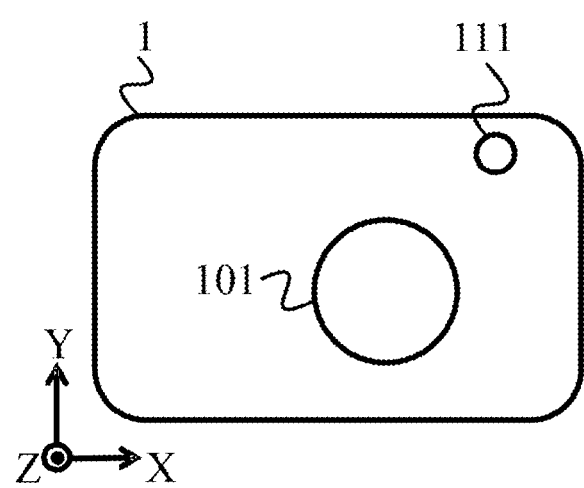
Figure 2:
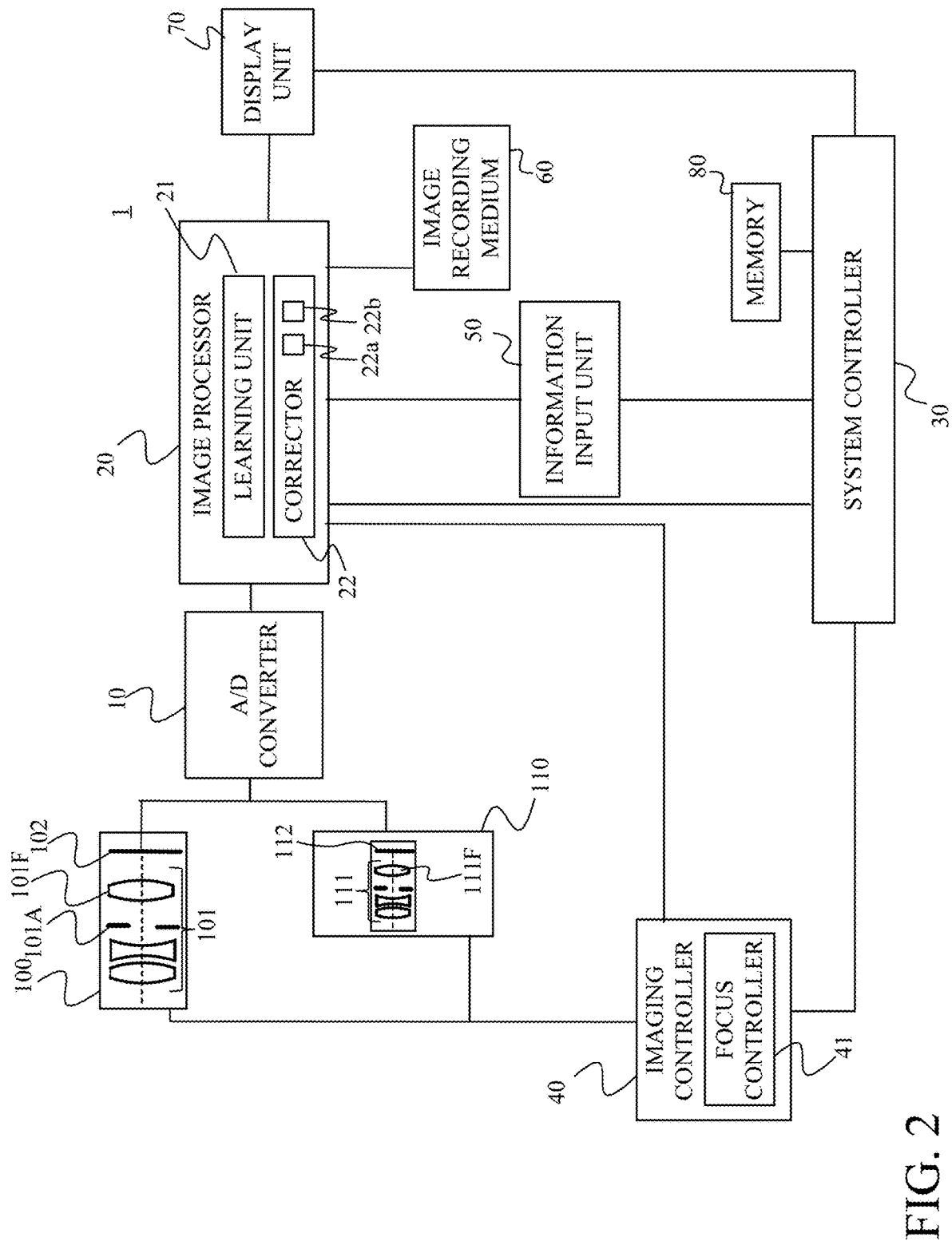
FIG. 2 is a block diagram of an imaging apparatus according to the first embodiment.

Referring now to FIGS. 1A, 1B, and 2, a description will be given of an imaging apparatus according to a first embodiment of the present invention. FIGS. 1A and 1B are overviews of the imaging apparatus 1. FIG. 1A is a perspective view, and FIG. 1B is a front view. FIG. 2 is a block diagram of the imaging apparatus 1. In this embodiment, the imaging apparatus 1 executes an image processing method and reduces the noise amount while restoring the high frequency component in a captured image.

The imaging apparatus 1 includes a main (primary) image capturer 100 used to capture an image of a wide angle-of-view object, and a sub (secondary) image capturer 110 used to capture an image of a narrow angle-of-view object. The main image capturer 100 includes an imaging optical system 101 and an image sensor (first image sensor) 102. The imaging optical system 101 includes one or more lenses, a diaphragm (aperture stop) 101A, and a focus lens 101F (focus mechanism), and images light from an unillustrated object on the image sensor 102. The imaging optical system 101 may be a magnification varying optical system having a variable focal length through driving its one or more lenses. In FIG. 1, the imaging optical system 101 is configured as part of the imaging apparatus 1 (integrally with the imaging apparatus 1), but may be an imaging optical system of an interchangeable type (attachable to and detachable from the imaging apparatus body) as in the single-lens reflex camera.

The image sensor 102 is a solid-state image pickup element, such as a CMOS sensor or a CCD sensor, photoelectrically converts an optical image (object image) formed through the imaging optical system 101, and outputs an analog electric signal (image signal). The diaphragm 101A and the focus lens 101F in the imaging optical system 101 is mechanically driven by an imaging controller 40 (focus controller 41) in accordance with a control instruction from the system controller 30. The imaging controller 40 controls the aperture diameter of the diaphragm 101A according to a set aperture value (F-number). The focus controller 41 performs focusing by controlling a position of the focus lens 101F in accordance with an object distance.

An A/D converter 10 converts an analog electrical signal generated by a photoelectric conversion of the image sensor 102 into a digital signal, and outputs the digital signal to an image processor 20. The image processor 20 performs so-called development processing, such as pixel interpolation processing, luminance signal processing, and color signal processing, for the digital signal output from the A/D converter 10 to generate an image. The image generated by the image processor 20 is recorded on an image recording medium 60, such as a semiconductor memory and an optical disc. The image generated by the image processor 20 may be displayed on a display unit 70. An information input unit 50 inputs various information in accordance with the user's operation. Examples of various information contain imaging conditions in capturing an image, and more specifically the F-number, the ISO sensitivity, and the like of the main image capturer 100.

The sub image capturer 110 includes an imaging optical system 111 and an image sensor (second image sensor) 112. The imaging optical system 111 is a single-focus imaging optical system that causes light from an unillustrated object to form an image on the image sensor 112. The imaging optical system 111 is a (telephoto) optical system having a narrower angle-of-view than that of the imaging optical system 101. The imaging optical system 111 also has a focus lens 111F. The analog electrical signal (image signal) generated by a photoelectric conversion of the image sensor 112 is treated in the same manner as the analog electrical signal (image signal) generated by the image sensor 102, and the image processor 20 generates an image based on an image signal output from the image sensor 112. The image generated by the image processor 20 can be displayed on the display unit 70 in the same manner as the main image capturer 100. Here, the sub image capturer 110 may be attachable to and detachable from the imaging apparatus 1, and a sub image capturer suitable for the main image capturer 100 may be selected from the plurality of sub image capturers 110 and attached to the imaging apparatus 1.

The sub image capturer 110 is a telephoto image capturer that captures an image at an angle of view narrower than the main image capturer 100. The image sensor 112 provided in the sub image capturer 110 has a smaller imaging area in which the pixels constituting the image sensor are disposed, and a smaller pixel size (pixel pitch) than the image sensor 102 provided in the main image capturer 100. In other words, the image (first input image) acquired by the main image capturer 100 is a wide angle image having a small noise amount, and the image (second input image) acquired by the sub image capturer 110 is a telephoto image having a relatively large noise amount.

A description will be given of the noise amount in this application. A noise amount $\sigma 0$ included in an image is obtained by a measurement or estimation based on the image. When the noise is a uniform white Gaussian noise in a real space and frequency space, the noise contained in the input image can be estimated from the MAD (Median Absolute Deviation) as illustrated in the following expression.

$$\text{MAD}=\text{median}(|w\text{HH1}-\text{median}(w\text{HH1})|) \tag{1}$$

The MAD is calculated with a median of the wavelet coefficients wHH1 in a HH1 sub-band image obtained by a wavelet transformation of the input image. Then, the standard deviation of the noise component can be estimated because the standard deviation and the MAD have the following relationship.

$$\sigma 0 = MAD/0.6745 \quad (2)$$

In the wavelet transform of an image, the wavelet transform is performed in the horizontal direction of the image to decompose it into the low frequency component and high frequency component, and the wavelet transform is performed in the vertical direction of the low frequency component and the high frequency component obtained by the decomposition. The wavelet transform divides an image into four images or four frequency-resolved sub band images having different frequency bands. Then, assume that LL1 is the sub band image of the low frequency band component (scaling coefficient) at the upper left, and HH1 is the sub band image of the high frequency band component (wavelet coefficient) at the lower right. The upper right (HL1) and lower left (LH1) sub band images are obtained by setting the high frequency band component in the horizontal direction and the low frequency band component in the vertical direction, and by setting the low frequency band component in the horizontal direction and the high frequency band component in the vertical direction.

The number of pixels in the image sensor 112 provided in the sub image capturer 110 and the number of pixels in the image sensor 102 provided in the main image capturer 100 are equal to each other. In other words, in the same object area (within the angle of view), the image acquired by the sub image capturer 110 has a resolution (reproducibility of the high frequency component) higher than that of the image acquired by the main image capturer 100. The image acquired by the sub image capturer 110 includes more high frequency components of the object than the those of the image acquired by the main image capturer 100.

The image processor 20 performs high frequency component restoration processing and noise reduction processing (also collectively referred to as correction processing) using the input image. The image processor 20 includes a learning unit 21 and a corrector 22. The corrector 22 includes an acquirer 22a and a calculator 22b. In executing the correction processing, the image processor 20 calls and uses the learning information stored in a memory (storage unit) 80. The details of the correction processing will be described later.

An output image such as a corrected image is displayed on the display unit 70 such as a liquid crystal display or the like, or stored in an image recording medium 60. The captured image may be stored in the image recording medium 60 and the correction may be made at an arbitrary timing. The captured image may be a motion image, and in this case, correction is made on each frame. The above series of controls is performed by the system controller 30.

Figure 4:
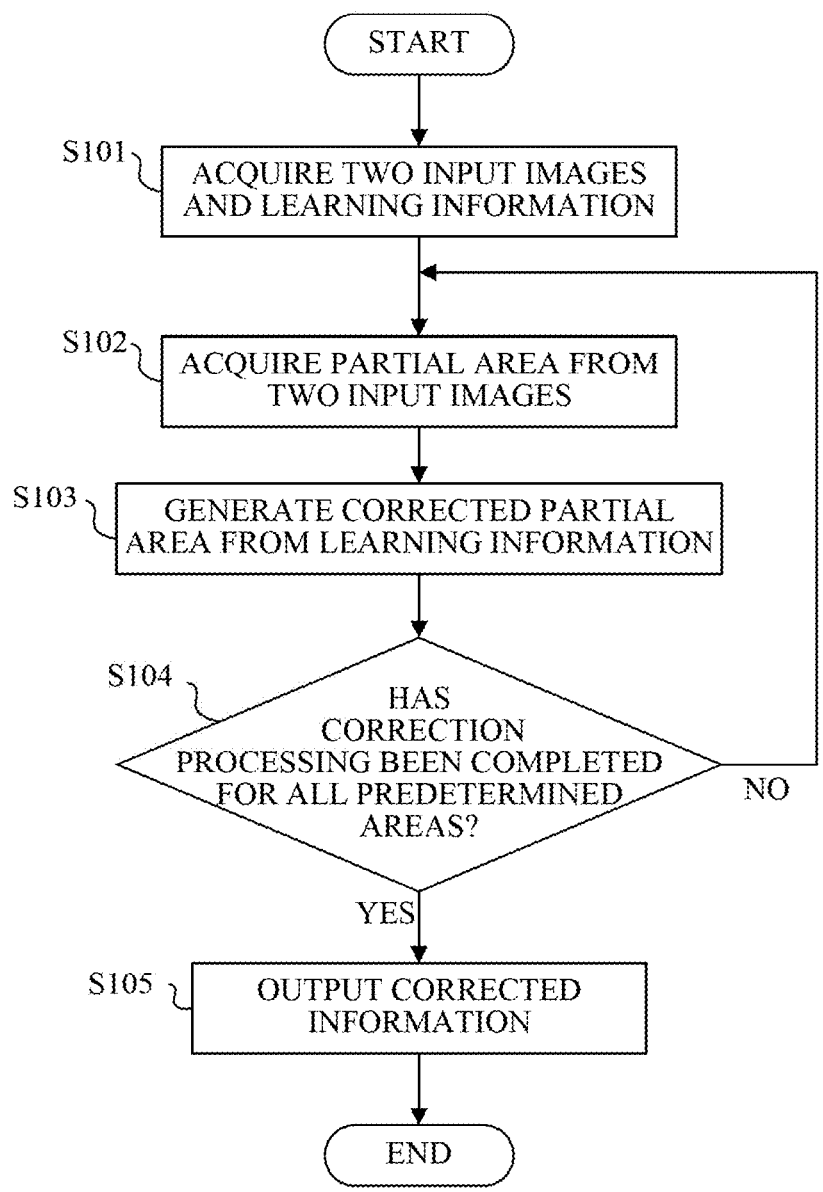
FIG. 4 is a flowchart showing image correction processing according to the first and second embodiments.

Referring now to FIG. 4, a description will be given of the high frequency component restoration processing and noise reduction processing (image correction processing) performed by the image processor 20. FIG. 4 is a flowchart showing the high frequency component restoration processing and noise reduction processing. Each step in FIG. 4 is mainly executed by the image processor 20 (corrector 22) based on an instruction from the system controller 30. While the learning information that has been previously learned is used for the decompression restoration processing of the high frequency component and the noise reduction processing, the details regarding learning will be described later.

Initially, in the step S101, the image processor 20 (corrector 22) acquires a first input image with a low resolution and a small noise amount, a second input image with a high resolution and a large noise amount (two input images), and learning information. The learning information is information previously learned by the learning unit 21 in order to connect two captured images and an image in which the high frequency component is restored and a noise amount is reduced.

Next, in the step S102, the corrector 22 (acquirer 22a) acquires partial images from the two input images. In other words, the corrector 22 (acquirer 22a) acquires a first image based on a first partial area that is part of the first input image from the first input image and a second image based on a second partial area that is part of the second input image from the second input image. The restoration processing of the high frequency component and the reduction processing of the noise amount are performed (for each partial area) in units of partial areas (first partial area, second partial area). In this embodiment, the first partial area and the second partial area correspond to the first input image and the second input image or the same object areas. The first partial area and the second partial area may be all of the first input image and the second input image, respectively.

Figure 3:
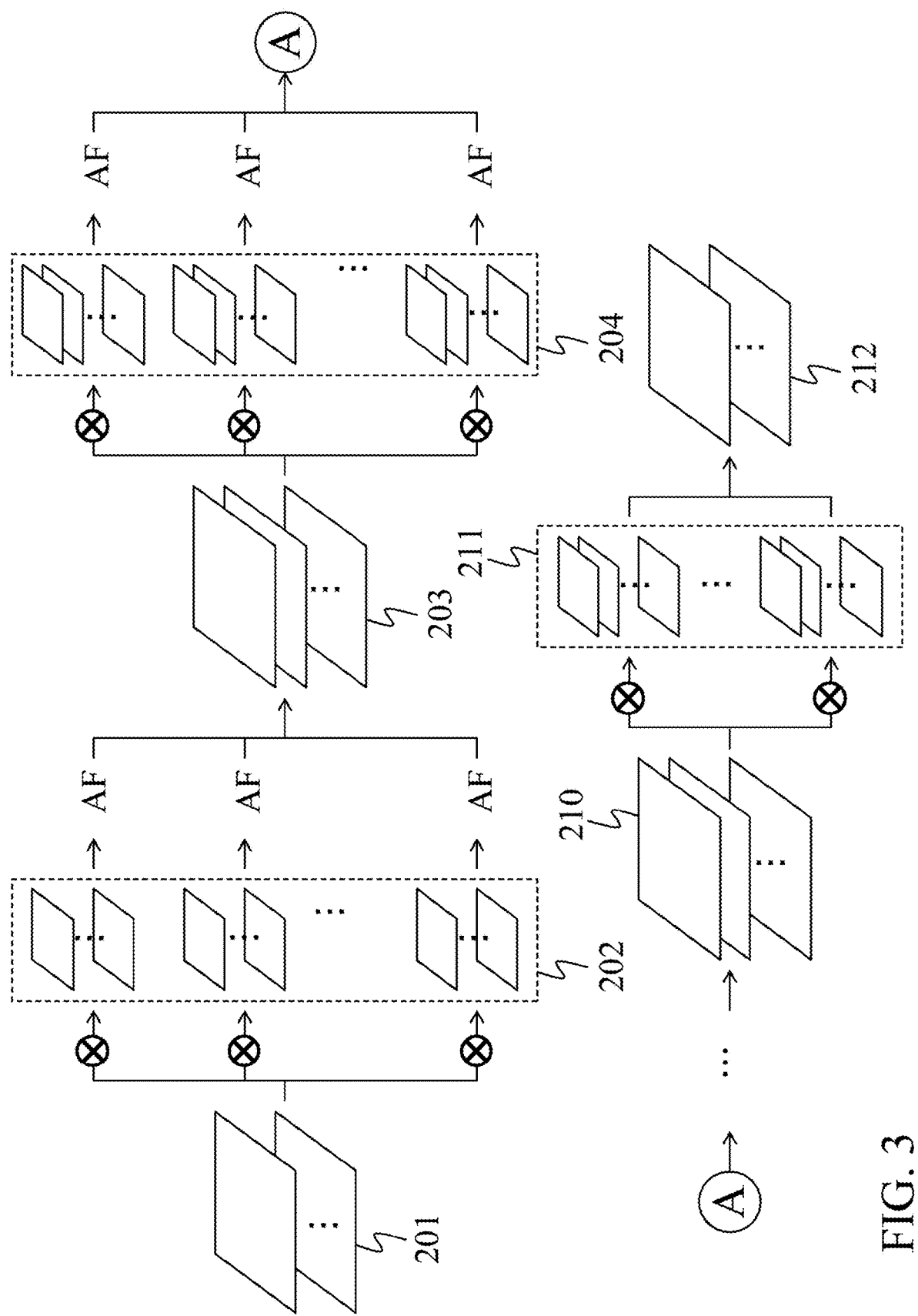
FIG. 3 is an explanatory view of a network structure that corrects an image according to the first and second embodiments.

Next, in the step S103, the corrector 22 generates a corrected partial area that is the partial area in which the high frequency component is restored and the noise amount (correction processing) is reduced with the learning information, the first partial area, and the second partial area. Referring now to FIG. 3, a description will be given of the details of the correction processing. FIG. 3 illustrates a network structure of the CNN (Convolutional Neural Network) as one deep learning type.

The CNN has a plurality of layered structures, and performs the linear transform and nonlinear transform using the learning information in each layer. Where n is an integer from 1 to N, a layer of an n-th order is referred to as an n-th layer, and the linear transform and nonlinear transform in the n-th layer are referred to as the n-th linear transform and n-th nonlinear transform, respectively. N is an integer of 2 or higher. Regarding a partial area 201, a convolution with each of the plurality of filters 202 (first linear transformation by a plurality of linear functions) is performed in the first layer. Thereafter, a conversion (first nonlinear transform) is performed using a nonlinear function called an activation function. In FIG. 3, the activation function is illustrated as AF. A plurality of partial areas 201 are drawn because the input image (captured image) has a plurality of channels. In this embodiment, each partial area has three channels of RGB (Red, Green, and Blue). The number of channels is not limited to this embodiment. Even if the partial area has a plurality of channels, it may be input to the CNN individually for each channel.

There are a plurality of filters 202. The corrector 22 individually calculates the convolution of each of the plurality of filters 202 and the partial area 201. A coefficient of the filter 202 is determined based on the learning information. The learning information may be a coefficient of the filter 202 (filter coefficient) itself or a coefficient when the filter 202 is fitted with a predetermined function. The number of channels of each of the filters 202 corresponds to the number of partial areas 201. When the number of channels in the partial area 201 is two or higher, a three-dimensional filter is formed (the third dimension represents the number of channels). A constant (which may be negative) determined from the learning information may be added to the result of the convolution.

Examples of the activation function f(x) may include the following expression (3) to (5).

$$f(x) = \frac{1}{1+e^{-x}} \quad (3)$$

$$f(x) = \tanh x \quad (4)$$

$$f(x) = \max(x, 0) \quad (5)$$

The expression (3) is called a sigmoid function, the expression (4) is called a hyperbolic tangent function, and the expression (5) is called ReLU (Rectified Linear Unit). "max" in the expression (5) represents a MAX function that outputs the maximum value among the arguments. The activation functions f(x) shown in the expressions (3) to (5) are all monotonically increasing functions. Maxout may be used for the activation function. Maxout is a MAX function that outputs a signal value as a maximum value at each pixel among a plurality of images which are outputs of the n-th linear transform.

In FIG. 3, a partial area that has received the first linear transform and the first nonlinear transform is referred to as a first transformed partial area 203. Each channel component of the first transformed partial area 203 is generated from a convolution of the partial area 201 and each of the plurality of filters 202. Hence, the number of channels in the first conversion partial area 203 is the same as the number of filters 202.

In the second layer, the first transformed partial area 203 receives a convolution (second linear transformation) with a plurality of filters 204 determined from learning information similar to the first layer, and a nonlinear transformation (second nonlinear transform) by an activation function. The filter 204 used in the second layer is generally not identical to the filter 202 used in the first layer. The size and number of the filters 204 may not match the filters 204. The number of channels in the filter 204 and the number of channels in the first conversion partial area 203 coincide with each other. The corrector 22 obtains intermediate data 210 by repeating the same operation up to the N-th layer (performing the n-th linear transform and the n-th nonlinear transform (n=1 to N)).

Finally, in the (N+1)-th layer, a corrected partial area 212 is obtained by adding a constant to the convolution of the intermediate data 210 and each of the plurality of filters 211 (N+1 linear transform). The filter 211 and the constant used herein are also determined based on the learning information. The number of channels in the corrected partial area 212 is the same as that of the partial area 201. Thus, the number of filters 211 is also the same as that in the partial area 201. The component of each channel of the corrected partial area 212 is obtained from an operation including the convolution of the intermediate data 210 and each of the filters 211 (the number of filters 211 may be one). The sizes of the partial area 201 and the correction partial area 212 may not coincide with each other. Since no data exists outside the partial area 201 in the convolution, the convolution result becomes smaller in size in the calculation only with the area where the data exists. The size can be maintained by setting a periodic boundary condition or the like.

The deep learning can exhibit a high performance because the high nonlinearity can be obtained by repeating the nonlinear transformation with a multilayer structure. If there is no activation function responsible for the nonlinear transform and the network includes only the linear transform, there is an equivalent single-layer linear transform regardless of the number of layers and thus the multilayer structure is useless. Apparently, the deep learning exhibits a stronger nonlinearity and a higher performance as the number of layers increases. In general, a system having at least three layers is called the deep learning.

Next, in the step S104 in FIG. 4, the corrector 22 determines whether the high frequency component restoration processing and noise amount reduction processing (correction processing or generation of the corrected partial area) have been completed for all predetermined areas in the first input image and the second input image. If the correction processing has not yet been completed for all of the predetermined areas, the flow returns to the step S102 and the corrector 22 acquires an uncorrected partial area from the captured image. On the other hand, when the correction processing has been completed for all of the predetermined areas (when the corrected partial area corrected for all of the predetermined areas is generated), the flow proceeds to the step S105.

In the step S105, the corrector 22 (calculator 22b) outputs an image (corrected image) that has received the high frequency component restoration processing and noise amount reduction processing. The corrected image is generated by combining the generated corrected partial areas. However, if the partial area is the entire captured image (input image), the corrected partial area is directly set to an image that has received the high frequency component restoration processing and noise amount reduction processing.

The above processing can restore the high frequency component in the captured image and obtain an image with a reduced noise amount. This embodiment corrects only the same object area of the first input image and the second input image. In other words, an image having an angle of view equal to or less than that of the second input image is generated as an output image. High-quality telephoto captured image with an angle of view equivalent with that of the sub image capturer 110 using captured images from the two image capturers or the main image capturer 100 with a large image capturer size and the sub image capturer 110 with a small image capturer size. In order to obtain a high-quality telescopically captured image by the normal imaging, it is necessary to set the imaging optical system 101 in the main image capturer 100 to a telephoto lens having the same angle of view as the imaging optical system 111 in the sub image capturer 110 but in general the telephoto lens corresponding to an image sensor having a large imaging area is large in size. This embodiment provides the main image capturer 100 capable of imaging with a small noise amount and the small sub image capturer 110 capable of telescopic imaging, and the above image processing method can maintain the apparatus size small and output a high-quality telescopically captured image.

Figure 5:
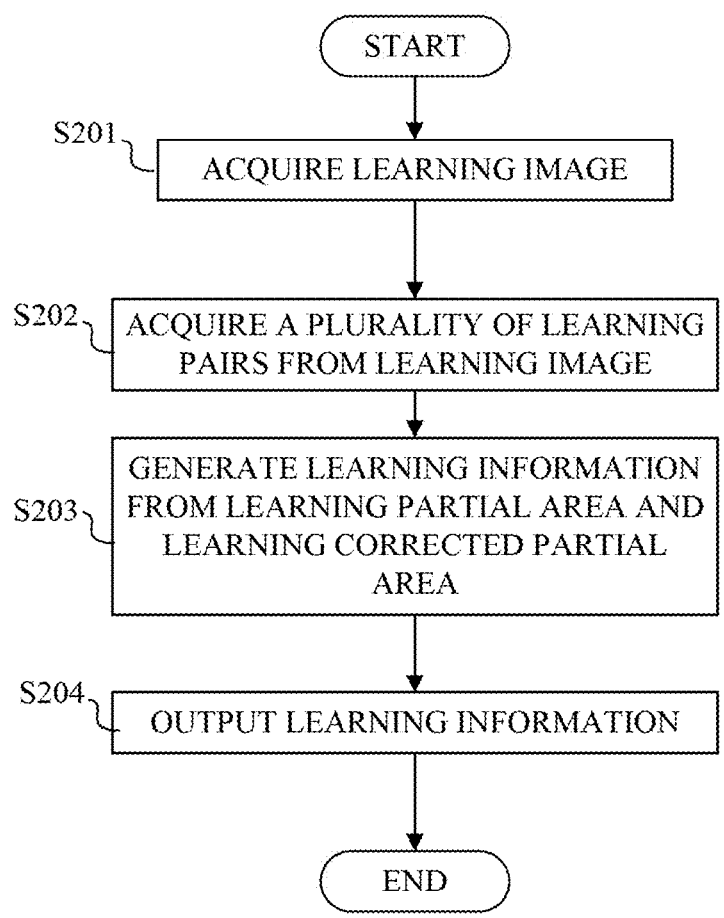
FIG. 5 is a flowchart showing learning of learning information according to the first and second embodiments.

Referring now to FIG. 5, a description will be given of learning of learning information (a method of manufacturing a learned model) according to this embodiment. FIG. 5 is a flowchart showing learning of learning information. Each step in FIG. 5 is mainly performed by the learning unit 21 in the imaging apparatus 1 (image processor 20). However, this embodiment is not limited to this example, and learning of learning information may be performed in a device (calculation apparatus) different from the imaging apparatus 1 before the high frequency component is restored and the noise amount is reduced. This embodiment describes the learning unit 21 in the imaging apparatus 1 that learns learning information.

Initially, in the step S201, the learning unit 21 acquires at least one set of learning images. One set of learning images is a plurality of images in which the same object exists, and includes a first input learning image as a wide-angle image with a small noise amount, a second input learning image as a telephoto image with a large noise amount, and an output learning image as a telephoto image with a small noise amount. The first input learning image and the second input learning image may be in one-to-one correspondence with the output learning image, or a plurality of learning images may exist for one output learning image. In the latter case, the first input learning image and the second input learning image are a plurality of images having different noise amounts and the like.

A simulation or an actually captured image can be used as a method of preparing a learning image. In the simulation, an input learning image may be generated by performing an imaging simulation based on the image quality deterioration factor of the image capturer for the output learning image. When the actually captured image is used, images may be used obtained by capturing the same object in the main image capturer 100 and the sub image capturer 110 in the imaging apparatus 1 under the same condition. The learning image may include an object having a variety of characteristics. This is because an image having a characteristic not included in the learning image cannot be corrected with high accuracy.

Next, in the step S202, the learning unit 21 acquires a plurality of learning pairs from the learning image acquired in the step S201. The learning pair includes a learning partial area (learning area) and a learning corrected partial area. The learning corrected partial area is acquired from the first input learning image and the second input learning image, and its size is the same as the partial area of the captured image acquired in the step S102. The learning partial area is obtained from the output learning image, and the center of the learning partial area is located at the same position in the image as the center of the learning corrected partial area. The size is the same as the corrected partial area generated in the step S103. As described above, the pair (learning pair) of learning partial area and learning corrected partial area does not have to be in one-to-one correspondence. One learning corrected partial area and a plurality of learning partial areas may be paired (grouped).

Next, in the step S203, the learning unit 21 acquires (generates) learning information through learning from the plurality of learning pairs (learning partial area and the learning corrected partial area). The learning uses the same network structure as the network structure that restores the high frequency component and reduces the noise. This embodiment inputs the learning corrected partial area into the network structure illustrated in FIG. 3, and calculates an error between the output result and the learning partial area. In order to minimize this error, the optimization is performed by updating coefficients of the plurality of filters used in the first to (N+1)-th layers and constants to be added (learning information) using, for example, an error backpropagation method or the like. The initial values of the coefficient and constant of each filter can be arbitrarily set, and are determined at random, for example. Alternatively, pre-training, such as Auto Encoder, may be performed to previously learn the initial value for each layer.

A method of inputting all learning pairs into a network structure and of updating the learning information using all the information is called batch learning. This learning method becomes computationally intensive as the number of learning pairs increases. On the other hand, a learning method that uses only one learning pair for updating learning information and uses a different learning pair for each update is called online learning. Although this method does not increase a calculation amount even if the number of learning pairs increases, it is greatly affected by the noise present in one learning pair. Hence, a mini batch method located between these two methods may be used. The mini batch method extracts a small number of all learning pairs, and uses them to update the learning information. The next update extracts and uses the different small number of learning pairs. Repeating this process can reduce the disadvantages of the batch learning and online learning, and easily obtain a high correction effect.

Next, in the step S204, the learning unit 21 outputs the learning information that has been learned. This embodiment stores the learning information in the memory 80. The above process can learn the learning information for restoring the high frequency component and for reducing the noise amount. In other words, a learned model can be manufactured for the high-frequency component restoration and noise reduction.

In addition to the above processing, a means for improving the CNN performance may be used in combination. For example, pooling, which is dropout or downsampling, may be performed at each layer of the network to improve the robustness. Alternatively, in order to improve the learning accuracy, the means may use the ZCA whitening that normalizes the average value of the pixels of the learning image to 0 and the dispersion to 1 and eliminates the redundancy of adjacent pixels, etc.

FIGS. 6A to 6D are image processing results according to this embodiment. FIG. 6A illustrates a first image, FIG. 6B illustrates a second image, FIG. 6C illustrates an output image obtained by image processing according to this embodiment, and FIG. 6D illustrates a ground truth (correct) image. All images in FIGS. 6A to 6D are 256×256 pixel monochrome images, and pixel values are normalized so as to be in the range of [0 1]. All images are actually captured images.

FIG. 7 shows numerical calculation results of the image processing according to this embodiment, and the image quality of each of the first image (main image), the second image (sub image), and the output image obtained by the image processing according to this embodiment is represented by the image quality evaluation index SSIM. The SSIM has a value of 0 to 1, and the closer to 1 the value is, the image is more similar to the correct image. It can be seen from FIG. 7 that the value of the image quality evaluation index SSIM is closer to 1 in the output image obtained by the image processing according to this embodiment than in each of the first image and the second image. It is thus quantitatively understood that the CNN can be used to convert a high frequency component into a telephoto image in which the noise amount is reduced and the high-frequency component is restored based on the wide-angle image with a small noise amount and the telephoto image with a large noise amount.

This embodiment can provide an imaging apparatus that can perform the restoration processing and reduction processing of the noise amount for the high frequency component in the captured image.

Second Embodiment

Figure 8:
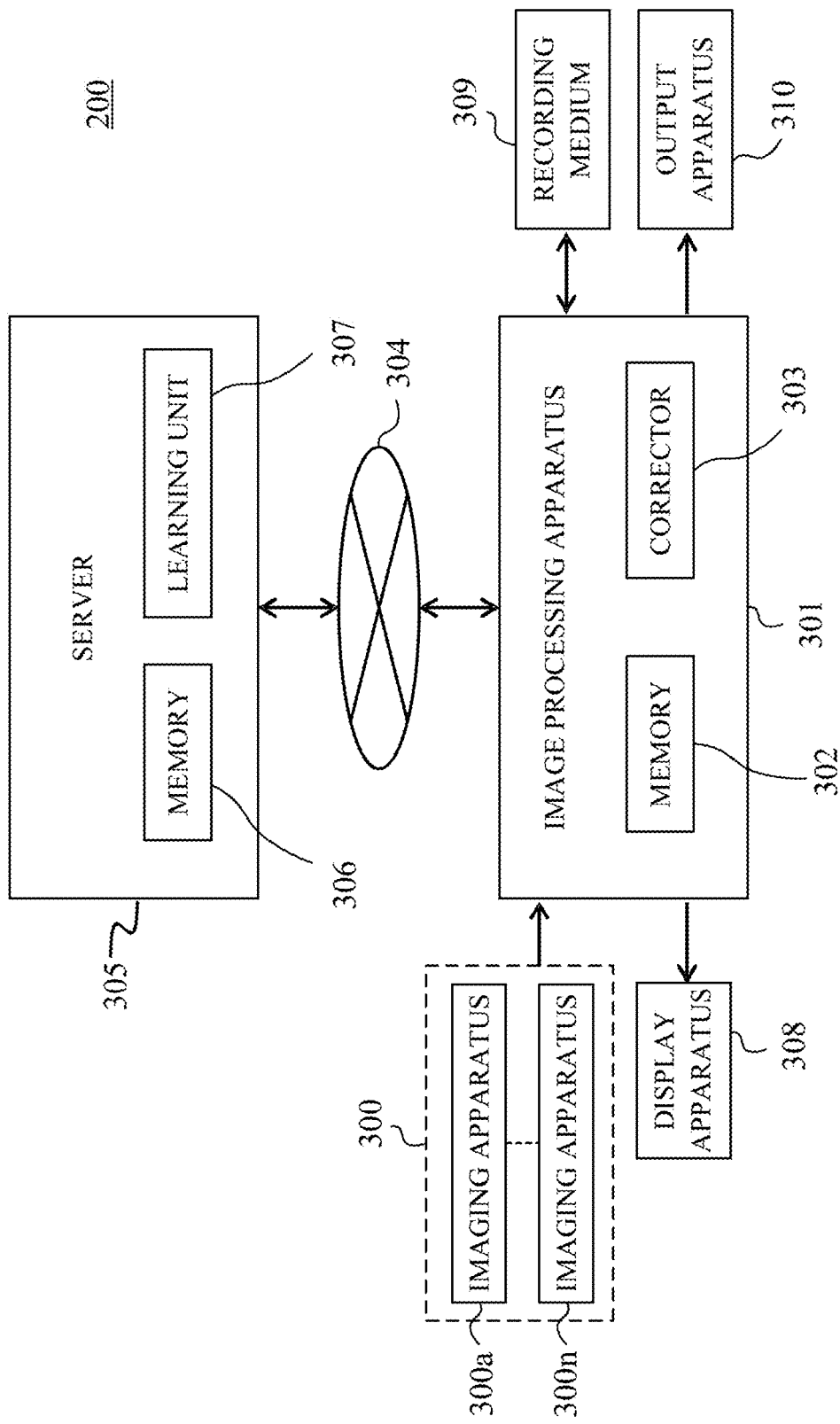
FIG. 8 is a block diagram of an image processing system according to the second embodiment.
Figure 9:
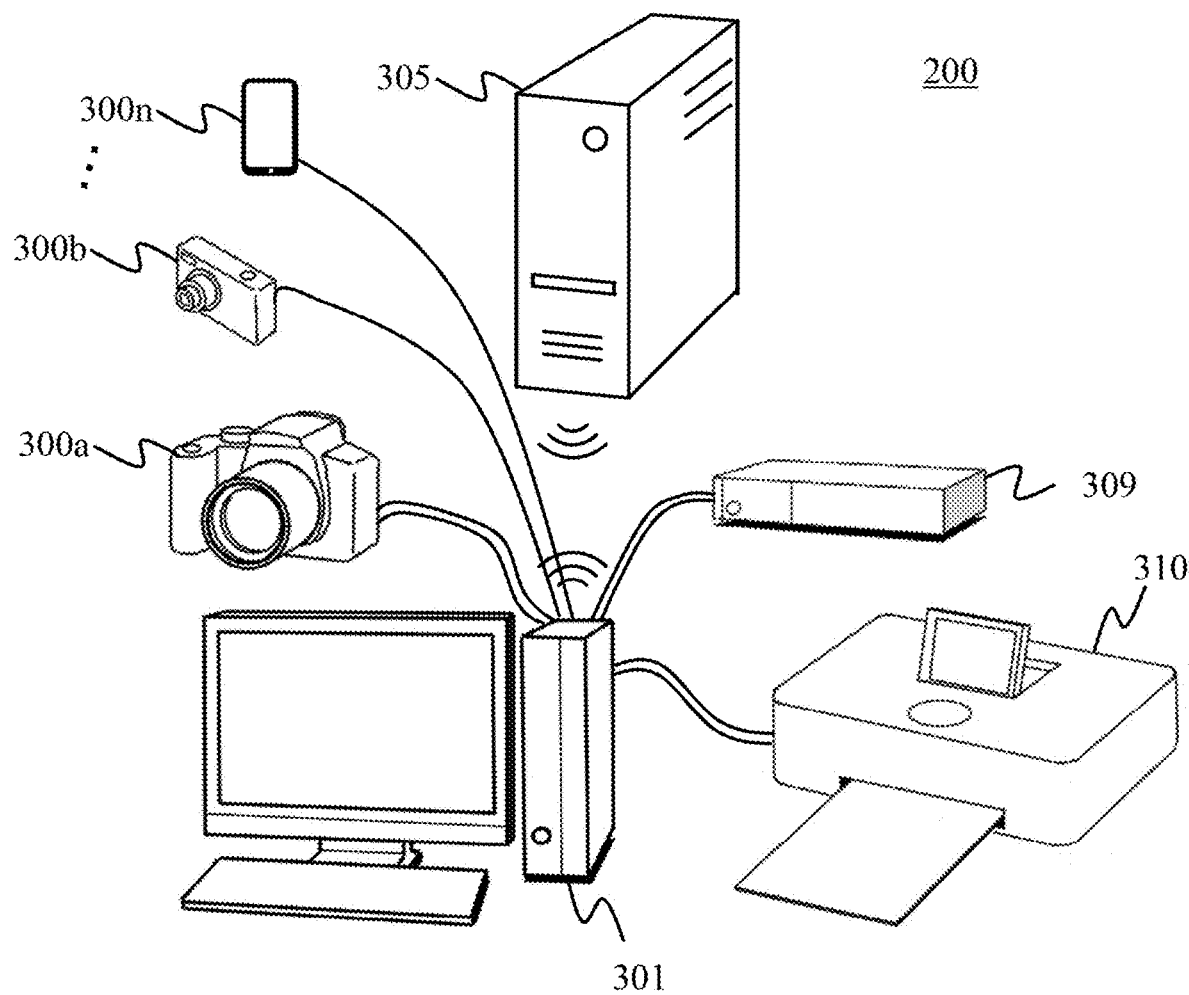
FIG. 9 is an overview of the image processing system according to the second embodiment.

Referring now to FIGS. 8 and 9, a description will be given of a second embodiment that applies the image processing method according to the present invention to an image processing system. This embodiment includes an image processing apparatus that corrects a captured image, an imaging apparatus that acquires a captured image, and a server that individually performs learning. This embodiment switches the learning information to be used by determining the type of the imaging apparatus used for imaging. A highly accurate image correction is available based on the learning information individually prepared for each combination of imaging apparatuses used for imaging.

FIG. 8 is a block diagram of an image processing system 200. FIG. 9 is an overview of the image processing system 200. As illustrated in FIGS. 8 and 9, the image processing system 200 includes a plurality of imaging apparatuses 300, an image processing apparatus 301, a server 305, a display apparatus 308, a recording medium 309, and an output apparatus 310.

The imaging apparatus 300 includes a plurality of imaging apparatuses 300a, 300b, . . . , 300n. This embodiment can set, for example, a common single-lens reflex camera among the plurality of imaging apparatuses 300 to the main image capturer described in the first embodiment, and a compact camera to the sub image capturer. The sub image capturer may use a small camera mounted on a smartphone or the like. In this embodiment, the present invention is not limited to two imaging apparatuses used as the plurality of imaging apparatuses, and three or more imaging apparatuses can be used.

Captured images (input images) captured using the plurality of imaging apparatuses 300a to 300n are stored in a memory 302 provided in the image processing apparatus 301. The image processing apparatus 301 is connected to a network 304 in a wired or wireless manner, and can access the server 305 via the network 304. The server 305 includes a learning unit 307 that learns the learning information for reducing a noise amount while restoring a high frequency component in a captured image, and a memory 306 that stores the learning information. A corrector 303 (image processor) provided in the image processing apparatus 301 acquires the learning information from the memory 306 in the server 305 via the network 304, and reduces the noise amount while restoring the high frequency component in the captured image. The generated output image is output to at least one of the display apparatus 308, the recording medium 309, and the output apparatus 310. The display apparatus 308 is, for example, a liquid crystal display or a projector. The user can work while confirming the image during processing via the display apparatus 308. The recording medium 309 is, for example, a semiconductor memory, a hard disk drive, or a network server. The output apparatus 310 is, for example, a printer. The image processing apparatus 301 may serve to provide development processing and other image processing as needed. The restoration of the high frequency component, the noise reduction processing, and the learning of learning information are the same as those in the first embodiment, and thus a description thereof will be omitted.

Thus, the image processing method according to each embodiment includes the steps of acquiring a first image based on a first area in a first input image (all or part of areas in the first input image), acquiring a second image based on a second area in a second input image (all or part of areas in the second input image) (S102). The image processing method further includes the step of calculating an output image (corrected image) in which a high frequency component is restored and a noise amount is reduced based on the first area and the second area using a multilayer neural network (S103 to S105).

The first area may be a first partial area of the first input image, and the second area is a second partial area of the second input image. The second input image may have a narrower angle of view and a larger noise amount than the first input image. In the step of calculating the output image, the output image may be calculated such that the angle of view of the output image is equal to or less than that of the second input image.

The first image may be captured by the first image sensor (image sensor 102), and the second image is captured by a second image sensor (image sensor 112) having smaller pixels than those in the first image sensor. The first image may be captured using the first image sensor, and the second image may be captured using the second image sensor having an imaging area smaller than that of the first image sensor.

The image processing method may include the step of acquiring the learning information that has been previously learned. The step of calculating the output image may have the following first step and second step, where N is an integer of 2 or higher and n is an integer from 1 to N. The first step generates intermediate data for the first image and the second image by sequentially executing an n-th linear transformation by each of the plurality of linear functions based on the learning information and an n-th nonlinear transformation by a nonlinear function until n is changed from 1 to N. The second step performs, for the intermediate data, an (N+1)-th linear transformation by at least one linear function based on the learning information.

The learning information may include a learning image that includes a set of a first input learning image, a second input learning image, and an output learning image. The first input learning image may be an image of a first noise amount (small noise amount) at a first angle of view (wide angle). The second input learning image may be an image of a second noise amount (large noise amount) larger than the first noise amount at an angle of view (telephoto) narrower than the first angle of view. The output learning image may be an image of a third noise amount (small noise amount) smaller than the second noise amount at an angle of view (telephoto) narrower than the first angle of view. The same object may exist in the first input learning image, the second input learning image, and the output learning image. At least one of the first input learning image and the second input learning image may be an image generated by a simulation.

Other Embodiments

The present invention can be implemented as an image processing system 200 that includes a first apparatus (a user terminal such as an imaging apparatus, a smartphone, and a PC) which makes a request for image processing and substantially controls the entire system and a second apparatus (such as a server) that performs the image processing according to the present invention. For example, the corrector 303 in the image processing system 200 according to the second embodiment is provided on the side of the server 305 as the second apparatus, and the image processing apparatus 301 as the first apparatus requests the server 305 for the image processing using the first image and the second image. Then, the first apparatus (user terminal) includes a transmitter configured to transmit a request for image processing to the second apparatus (server), and the second apparatus (server) includes a receiver configured to receive the request sent from the first apparatus (user terminal).

In this case, the first processing apparatus may transmit the first image and the second image to the second apparatus as well as the image processing request. However, the second apparatus may obtain the first image and the second image stored in place (external storage device) other than the first apparatus in response to the request of the first apparatus. After the second apparatus performs the image processing for the first image and the second image, the second apparatus may transmit the output image to the first apparatus. The thus configured image processing system can perform processing by the corrector with a relatively heavy processing load on the second apparatus side, and reduce the burden on the user terminal side.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processor (CPU), micro processor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can provide an image processing method, an image processing apparatus, an imaging apparatus, a program, and a storage medium capable of reducing the noise amount while restoring high frequency components of a captured image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2018-180646, filed on Sep. 26, 2018 and 2019-152000, filed on Aug. 22, 2019, which are hereby incorporated by reference herein in their entirety.

What is claimed is:

1. An image processing method comprising the steps of:
acquiring a first image of an object;
acquiring a second image of the object that has a larger noise amount than the first image and has more high frequency components of the object than the first image;
inputting the first image and the second image into a neural network; and
generating a third image using the neural network, the third image having more high frequency components of the object than the first image and smaller noise amount of the object than the second image.

2. The image processing method according to claim 1, wherein the first image and the second image are at least parts of the first input image and the second input image, respectively.

3. The image processing method according to claim 2, wherein the first input image has an angle of view wider than that of the second input image.

4. The image processing method according to claim 3, wherein an angle of view of the third image is equal to or less than that of the second input image.

5. The image processing method according to claim 1, wherein the second image is obtained by imaging using an image sensor having a pixel pitch smaller than that of an image sensor used to acquire the first image.

6. The image processing method according to claim 1, wherein the second image is obtained by imaging using an image sensor having an imaging area smaller than that of an image sensor used to acquire the first image.

7. The image processing method according to claim 1, wherein the neural network has at least one convolutional layer.

8. The image processing method according to claim 1, further comprising the step of acquiring learning information on the neural network, which has been previously learned,
wherein where N is an integer of 2 or more and n is an integer from 1 to N, the step of generating the third image includes the steps of:
generating intermediate data for the first image and the second image, by sequentially executing an n-th linear transformation by each of the plurality of linear functions based on the learning information and an n-th nonlinear transformation by a nonlinear function until n is changed from 1 to N; and
performing, for the intermediate data, an (N+1)-th linear transformation by at least one linear function based on the learning information.

9. The image processing method according to claim 8, wherein the learning information includes a plurality of learning images having the same object, and information learned with a first input learning image, a second input learning image having a larger noise amount than the first input learning image and more high frequency components of the object than the first input learning image, and an output learning image having more high frequency components of the object than the first input learning image and smaller noise amount of the object than the second input learning image.

10. The image processing method according to claim 9, wherein at least one of the first input learning image and the second input learning image is generated by a simulation.

11. The image processing method according to claim 1, further comprising:
acquiring first partial images from the first image;
acquiring second partial images from the second image; and
acquiring third partial images by inputting the first partial images and the second partial images into the neural network,
wherein the third image is generated by combining the third partial images.

12. An image processing apparatus comprising:
a processor that executes instructions to function as:
an acquirer that acquires a first image of an object, and a second image of the object that has a larger noise amount than the first image and has more high frequency components of the object than the first image; and a calculator that inputs the first image and the second image into a neural network, and generates a third image using the neural network, the third image having more high frequency components of the object than the first image and smaller noise amount of the object than the second image.

13. The image processing apparatus according to claim 12, further comprising a memory that stores learning information on the neural network which has been previously learned.

14. The image processing apparatus according to claim 12, wherein:

the acquirer acquires first partial images from the first image and second partial images from the second image; and the calculator acquires third partial images by inputting the first partial images and the second partial images into the neural network, and generates the third image by combining the third partial images.

15. An imaging apparatus comprising:

the image processing apparatus according to claim 12;

a first image capture device that captures the first image; and a second image capture device that captures the second image.

16. A non-transitory computer-readable storage medium storing a program for causing a computer to execute the image processing method according to claim 1.

17. An image processing system comprising a first apparatus and a second apparatus, wherein the first apparatus includes a transmitter that transmits a request for causing the second apparatus to execute image processing using a first image of an object and a second image of the object having a larger noise amount than the first image and more high frequency components of the object than the first image, and wherein the second apparatus includes:

a receiver that receives the request sent from the transmitter; and a processor that executes instructions to function as:

an acquirer that acquires the first image and the second image; and a calculator that inputs the first image and the second image into a neural network and generates a third image having more high frequency components of the object than the first image and smaller noise amount of the object than the second image.

18. The image processing system according to claim 17, wherein:

the acquirer acquires first partial images from the first image and second partial images from the second image; and the calculator acquires third partial images by inputting the first partial images and the second partial images into the neural network, and generates the third image by combining the third partial images.

19. A method of manufacturing a learned model of a neural network, the method comprising the steps of:

acquiring a first image of an object;

acquiring a second image of the object having a larger noise amount than the first image and more high frequency components of the object than the first image;

acquiring a third image having more high frequency components of the object than the first image and smaller noise amount of the object than the second image; and learning a parameter for the neural network by using the first image, the second image, and the third image.

20. The method according to claim 19, further comprising:

acquiring first partial images from the first image;

acquiring second partial images from the second image; and acquiring third partial images by inputting the first partial images and the second partial images into the neural network, wherein the third image is generated by combining the third partial images.

* * * * *